(12) United States Patent
Liu et al.

(10) Patent No.: US 11,645,759 B1
(45) Date of Patent: May 9, 2023

(54) BACKGROUND FILTERING METHOD AND BACKGROUND FILTERING SYSTEM BASED ON ROADSIDE SOLID-STATE LIDAR

(71) Applicant: Guangdong University of Technology, Guangzhou (CN)

(72) Inventors: Jianqi Liu, Guangzhou (CN); Lanfeng Liu, Guangzhou (CN); Haoyong Shi, Guangzhou (CN); Renke He, Guangzhou (CN)

(73) Assignee: Guangdong University of Technology, Guangzhou (CN)

( * ) Notice: Subject to any disclaimer, the term of this patent is extended or adjusted under 35 U.S.C. 154(b) by 0 days.

(21) Appl. No.: 17/969,481

(22) Filed: Oct. 19, 2022

(30) Foreign Application Priority Data

May 18, 2022 (CN) .......................... 202210536282.1

(51) Int. Cl.
*G06T 7/194* (2017.01)
*G06T 7/174* (2017.01)
*G06T 7/136* (2017.01)
*G01S 17/89* (2020.01)

(52) U.S. Cl.
CPC .............. *G06T 7/194* (2017.01); *G01S 17/89* (2013.01); *G06T 7/136* (2017.01); *G06T 7/174* (2017.01); *G06T 2207/10028* (2013.01); *G06T 2207/20021* (2013.01); *G06T 2207/20221* (2013.01)

(58) Field of Classification Search
CPC ......... G06T 7/194; G06T 7/136; G06T 7/174; G06T 2207/10028; G06T 2207/20021; G06T 2207/20221; G01S 17/89
See application file for complete search history.

(56) References Cited

U.S. PATENT DOCUMENTS

| 2020/0249353 A1* | 8/2020 | Di Cicco | G01S 17/931 |
| 2020/0379114 A1 | 12/2020 | Wu | |
| 2022/0189102 A1* | 6/2022 | Yang | G06T 1/20 |

FOREIGN PATENT DOCUMENTS

| CN | 112578406 A | 3/2021 |
| CN | 113176548 A | 7/2021 |
| CN | 113447953 A | 9/2021 |
| CN | 113514848 A | 10/2021 |
| CN | 113903179 A | 1/2022 |
| CN | 114384543 A | 4/2022 |

OTHER PUBLICATIONS

First Office Action issued in counterpart Chinese Patent Applicaiton No. 202210536282.1, dated Jun. 29, 2022.

* cited by examiner

*Primary Examiner* — Kenny A Cese
(74) *Attorney, Agent, or Firm* — Westbridge IP LLC (57) ABSTRACT

Disclosed are a background filtering method and a system based on a roadside solid-state lidar, whereby a spatial dividing method of solid-state lidar based on channel scanning angle is designed, single-channel point cloud is extracted, point cloud of each channel of all background data frames are fused and superimposed, each background space unit and non-background space unit based on channel scanning space are identified based on a given threshold; then real-time data frames are subjected to background difference based on channels to obtain the single-channel road user information data frames; the background filtering is achieved by splicing single-channel road user information data frames into a complete road user information data frame.

5 Claims, 7 Drawing Sheets

BACKGROUND FILTERING METHOD AND BACKGROUND FILTERING SYSTEM BASED ON ROADSIDE SOLID-STATE LIDAR

CROSS-REFERENCE TO RELATED APPLICATIONS

This application claims priority to Chinese Patent Application No. 202210536282.1, filed on May 18, 2022, the contents of which are hereby incorporated by reference.

TECHNICAL FIELD

The present application relates to the technical field of intelligent traffic perception, and in particular to a background filtering method and a background filtering system based on roadside solid-state lidar.

BACKGROUND

The number of vehicles has increased dramatically and traffic has become more congested as a result of the accelerated modernization of cities, making intelligent transportation a key focus of development in the transportation field today, and an intelligent vehicle infrastructure cooperative system—smart road, smart car—has therefore naturally become one of the research focuses in this field.

Vehicles and pedestrians should be monitored with particular emphasis as monitoring roads and vehicles, since they are the main participants of transportation, and information including speed and position of vehicles and pedestrians is a prerequisite for assuring traffic safety as well as preventing traffic accidents. In view of that, self-driving vehicles are normally provided with sensors of lidar, millimeter wave radar, camera, Global Position System (GPS) and Inertial Measurement Unit (IMU), etc., where lidar are widely used for their ability of perceiving environment in the middle and long distance that beyond human vision. Unlike traditional lidar sensors mounted on the vehicles, roadside lidar sensors are deployed at static positions around intersections or along roads; they are designed to collect cloud data of traffic point with centimeter-level spatial resolution and track data of road users with high-resolution; they are also used to optimize traffic control, reduce the incidence of traffic accidents, in addition to provide needed data for road-mounted sensors, and so on.

In the intelligent vehicle infrastructure cooperative system, target road user information is extracted from the data provided by the roadside lidar sensors, original data herein includes information of road user and static background, and background filtering is needed to separate the static background from dynamic road conditions so as to provide high-precision real-time road condition information for self-driving vehicles. However, as being required to be operated for a long period of time, mechanical rotary lidars produce dots with gradually declined accuracy as the working hours increase, and thus leading to a less than satisfactory background construction and background filtering performance; besides, prolonged operation also impairs the service life of the mechanical rotary lidars, which therefore need to be replaced regularly in order to ensure data accuracy, resulting in increased deployment costs, especially for multi-beam lidar, where costs increases dramatically; as for solid-state lidar, each channel will have a certain misalignment in the arrangement due to the characteristics of the internal structure, resulting in a different vertical angle that each channel can scan to, and adjacent channels will have repeated scans at a certain horizontal angle; the road users who are repeatedly scanned to may have a large density of point clouds in some areas, which will be seen as a background unit in the background filtering because of the improper selection of a threshold value, directly affecting the background filtering.

To address such problems, the present application provides a background filtering method based on roadside solid-state lidar, which solves the problem of precision reduction caused by long-time operation of roadside mechanical rotary lidar as well as the problems of short service life and high deployment cost of multi-beam roadside mechanical rotary lidar; it also eliminates the influence of repeated scanning area of solid-state lidar on filtering effect and provides accurate road user information for autonomous driving vehicles.

SUMMARY

In view of the problems existing in the prior art, the present application provides a background filtering method and a system based on roadside solid-state lidar, including: designing a spatial dividing method based on channel scanning angle of solid-state lidar firstly, obtaining data through the roadside solid-state lidar, using the obtained data as background constructing frames; respectively aggregating each channel point cloud of the background data frames by extracting single-channel point clouds, and obtaining fused data frames of number being same as that of channels of the solid-state lidar; then, identifying each background space unit and non-background space unit based on scanning space of channel according to a given threshold; respectively extracting channel point clouds of real-time data frames and placing the extracted channel point clouds into corresponding channel background space for background difference, obtaining road user information data frames of each channel; and splicing the obtained road user information data frames of each channel into a complete road user information data frame to realize background filtering.

To achieve the above objectives, the present application provides the following technical schemes:

a background filtering method based on roadside solid-state lidar, including:

dividing the scanning space of the roadside solid-state lidar according to the channel scanning angle of the solid-state lidar to obtain multi-frame point cloud data of the roadside solid-state lidar;

taking the obtained multi-frame point cloud data as the background data frame, and acquiring single-channel point cloud data of the background data frame through corresponding relation;

acquiring a fused point cloud data frame through methods of fusion and superimposition based on that single-channel point cloud data of the background data frame;

placing the fused point cloud data frame in the divided scanning space without changing its location, and obtaining a plurality of background spaces based on channels according to the given threshold;

placing a point cloud data frame to be tested in the background space for background difference after extracting point cloud of each channel, so as to obtain a single-channel road user information data frame; and splicing that single-channel road user information data frame into a complete road user information data frame to realize the background filtering of the roadside solid-state lidar.

Optionally, the placing a point cloud data frame to be tested in the background space for background difference after extracting point cloud of each channel so as to obtain a single-channel road user information data frame includes:

horizontally arranging a complete machine of solid-state lidar by L laser channels, where the corresponding relation between a Point ID of the point cloud and the laser channel is:

$$n_{ID} \div L = m \ldots i \quad (1);$$

among them, $n_{ID}$ is the Point ID of a $n^{th}$ point, L is a number of laser channels of the solid-state lidar, and i is in a range of $0 \leq i \leq L-1$; when i=0, that is, a remainder is 0, the point cloud at this time belongs to channel laser 0 . . . and when $i=L-1$, the point cloud at this time belongs to a channel laser (L−1); and after traversing the Point ID of all point clouds in a frame of data, which channel a single point cloud belongs to is determined based on the remainder obtained after dividing by the number of channels; and m is an integer value of $n_{ID}$ dividing L;

n frames of original data frames are selected as background constructing frames, and then channel point clouds are extracted, where L channel point clouds can be extracted from each frame respectively, and the n frames of original data frames are fused and superimposed into L frames of fused point clouds, with each frame of point cloud being an collection of single-channel point clouds of all background constructing frames.

Optionally, acquiring single-channel point cloud data of the background data frame through corresponding relation is achieved by the corresponding relation between index and channel of the point cloud.

Optionally, the acquiring a fused point cloud data frame through methods of fusion and superimposition based on that single-channel point cloud data of the background data frame includes: respectively extracting the point clouds of a same channel in the background data frame, and sequentially fusing and superimposing the extracted point clouds to obtain fused point cloud data frame with number of frames being same as the number of channels of the solid-state lidar.

Optionally, the acquiring a fused point cloud data frame through methods of fusion and superimposition based on that single-channel point cloud data of the background data frame includes: placing the fused point cloud data frame of each channel in the divided scanning space without changing location of point cloud, determining whether a corresponding space unit is the background unit based on the specified threshold, and recording an index of background unit to obtain that plurality of background spaces based on channels.

Optionally, the complete road user information data frame is obtained by splicing the single-channel road user information data frames without changing their positions.

The present application also provides a background filtering system based on the roadside solid-state lidar, including: a multi-frame point cloud data module, a single-channel point cloud data module of background data frame, a fusion and superimposition module, a background space module, a user information data frame module, and a background filtering module.

Optionally, the multi-frame point cloud data module is used for dividing a scanning space of the roadside solid-state lidar on a basis of data format of the solid-state lidar, and acquiring multi-frame point cloud data of the roadside solid-state lidar;

the single-channel point cloud data module of background data frame is used for obtaining that single-channel point cloud data of the background data frame through corresponding relation based on the multi-frame point cloud data as the background data frame;

the fusion and superimposition module is used for acquiring a fused point cloud data frame through fusion and superimposition on the basis of that single-channel point cloud data of the background data frame;

the background space module is used on a basis of placing the fused point cloud data frame in the divided scanning space, and obtaining a plurality of background spaces based on channels according to a specified threshold;

the user information data frame module is used on a basis of placing the background space for background difference based on channels according to a a point cloud data frame to be tested, so as to obtain a single-channel road user information data frame, includes: horizontally arranging a complete machine of solid-state lidar by L laser channels, where the corresponding relation between a Point ID of the point cloud and the laser channel is:

$$n_{ID} \div L = m \ldots i \quad (1);$$

among them, $n_{ID}$ is the Point ID of a $n^{th}$ point, L is a number of laser channels of the solid-state lidar, and i is in a range of $0 \leq i \leq L-1$; when i=0, that is, a remainder is 0, the point cloud at this time belongs to channel laser 0 . . . and when $i=L-1$, the point cloud at this time belongs to a channel laser (L−1); and after traversing the Point ID of all point clouds in a frame of data, which channel a single point cloud belongs to is determined based on the remainder obtained after dividing by the number of channels; and m is an integer value of $n_{ID}$ dividing L; n frames of original data frames are selected as background constructing frames, and then channel point clouds are extracted, where L channel point clouds can be extracted from each frame respectively, and the n frames of original data frames are fused and superimposed into L frames of fused point clouds, with each frame of point cloud being an collection of single-channel point clouds of all background constructing frames; and the background filtering module is used for splicing the single-channel road user information data frames into complete road user information data frames, so as to realize the background filtering of the roadside solid-state lidar.

The present application discloses a background filtering method as well as a background filtering system based on roadside solid-state lidar, whereby the problem of decreasing accuracy caused by long-time operation of roadside mechanical rotary lidar and the problem of short service life and high deployment cost of multi-beam roadside mechanical rotary lidar with more wire bundles are solved effectively; the influence of repeated scanning area of solid-state lidar on filtering effect is also eliminated, providing accurate road user information for autonomous driving vehicles.

BRIEF DESCRIPTION OF THE DRAWINGS

For a clearer description of the technical schemes of the present application, the following briefly describes the accompanying drawings to be used in the embodiments. Obviously, the drawings in the following description are only some of the embodiments of the present application, and other drawings are available to a person of ordinary skill in the art without creative labor.

DETAILED DESCRIPTION OF THE EMBODIMENTS

Hereinafter, a clear and complete description of the technical schemes in the embodiments of this application is given in conjunction with accompanying drawings in the embodiments of this application. Obviously, the described embodiments are only a part of the embodiments of this application, and not all of them. Based on the embodiments in this application, all other embodiments obtained by a person of ordinary skill in the art without making creative labor shall fall within the scope of protection of this application.

In order to make the above objectives, features and advantages of this application more obvious and understandable, the application is further explained in detail below with reference to the drawings and detailed description.

In order to solve the technical problems exist in the prior art, the present application adopts the following technical schemes: a background filtering method and a background filtering system based on a roadside solid-state lidar, including: firstly, designing a spatial dividing method based on channel scanning angle of point cloud of solid-state lidar; obtaining data through the roadside solid-state lidar, using the obtained data as background constructing frames; respectively aggregating each channel point cloud of the background data frames by extracting single-channel point clouds, and obtaining fused data frames of number being same as that of channels of the solid-state lidar; then, identifying each background space unit and non-background space unit based on scanning space of channel according to a given threshold; respectively extracting channel point clouds of real-time data frames and placing the extracted channel point clouds into corresponding channel background space for background difference, obtaining road user information data frames of each channel; and splicing the obtained road user information data frames of each channel into a complete road user information data frame to realize background filtering.

Embodiment 1

Figure 1:
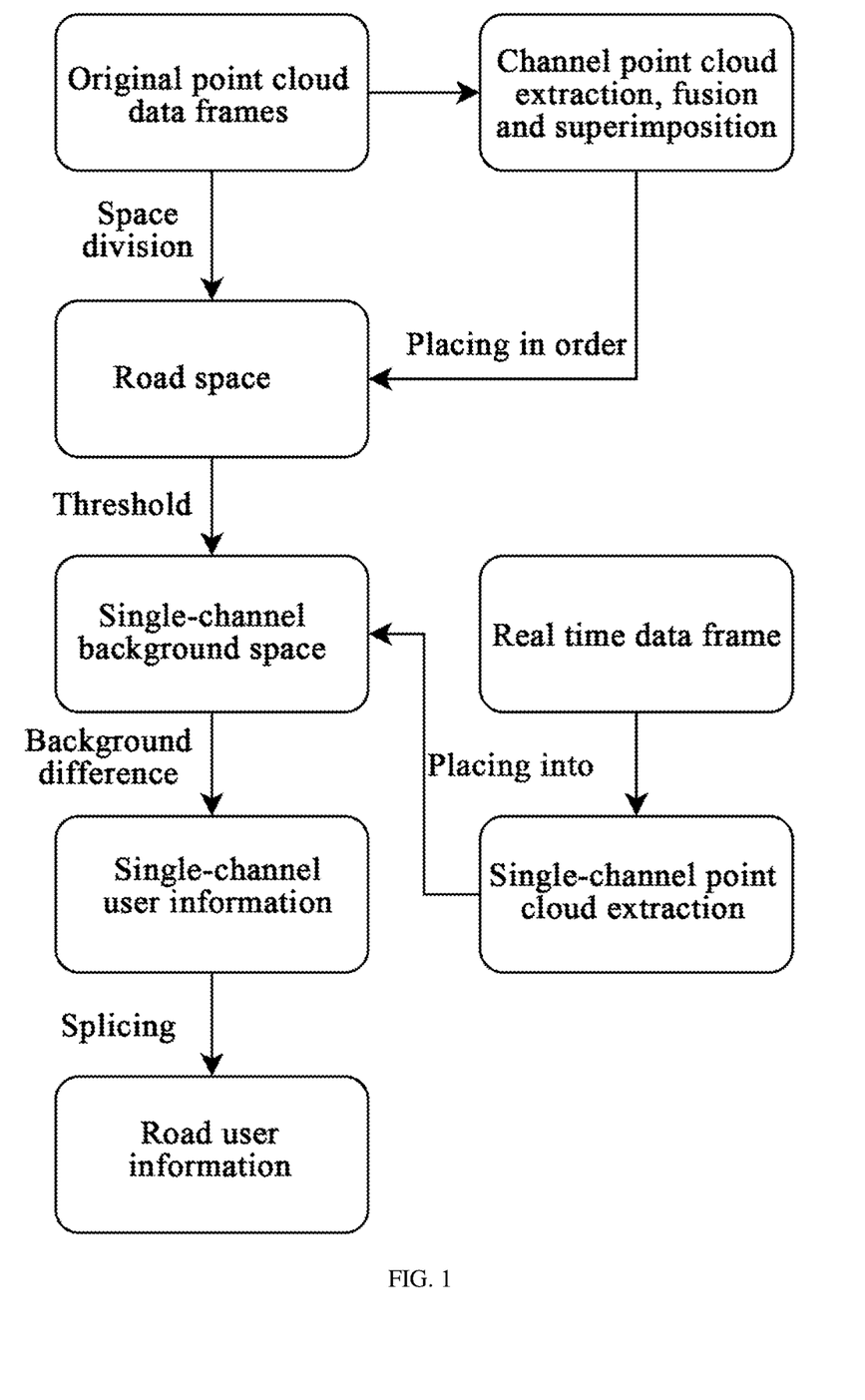
FIG. 1 illustrates a structural schematic diagram of a method of this application.

As shown in FIG. 1, firstly, the spatial dividing method based on the data format of point cloud of solid-state lidar; then, the data obtained by the roadside solid-state lidar is used as the background constructing frame, and by extracting the single-channel point cloud, each channel point cloud of the background data frame is respectively fused to obtain the fused data frames of number being same as that of channels of the solid-state lidar; then, based on the given threshold, each background space unit and non-background space unit based on the channel scanning space are identified; the channel point clouds of real-time data frames are respectively extracted and placed into the corresponding channel background space for background difference to obtain road user information data frames of each channel, and finally, the obtained road user information data frames of each channel are spliced into a complete road user information data frame to realize background filtering.

Detailed description: the present application takes RS-lidar-M1 solid-state lidar as an example, including but not limited to RS-lidar-M1 solid-state lidar. The following embodiments are used to illustrate the present application, but not to limit the scope of the present application.

Figure 2:
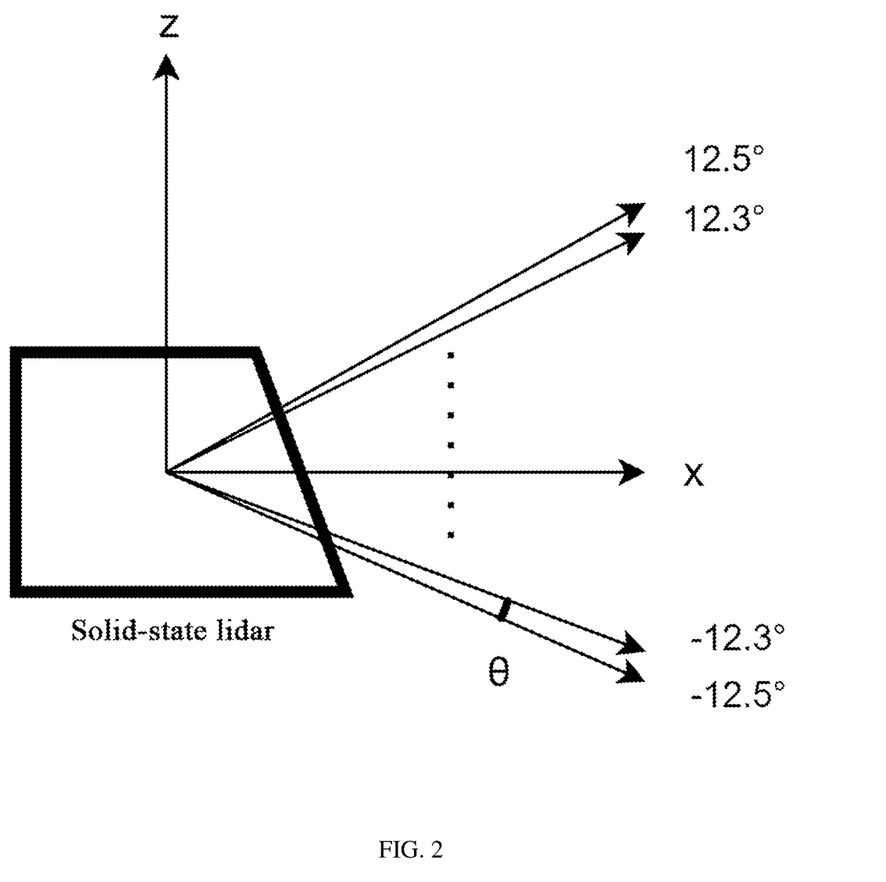
FIG. 2 shows a side view of a solid-state lidar.
Figure 3:
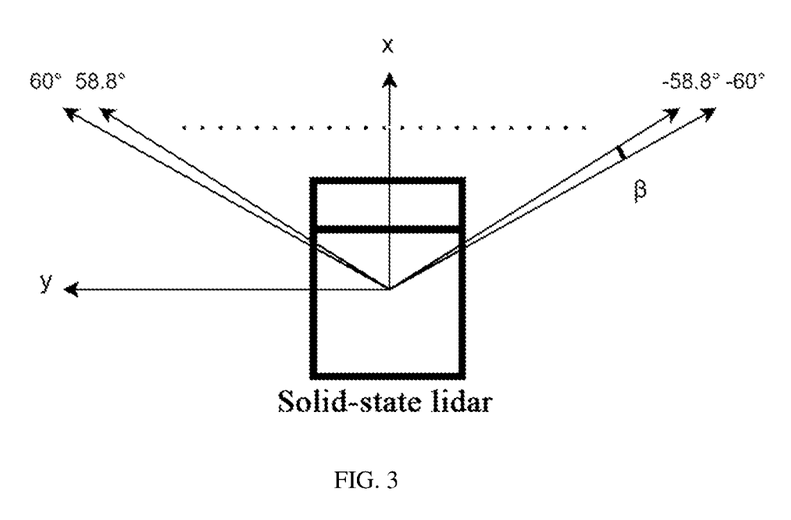
FIG. 3 shows a top view of the solid-state lidar.
Figure 4:
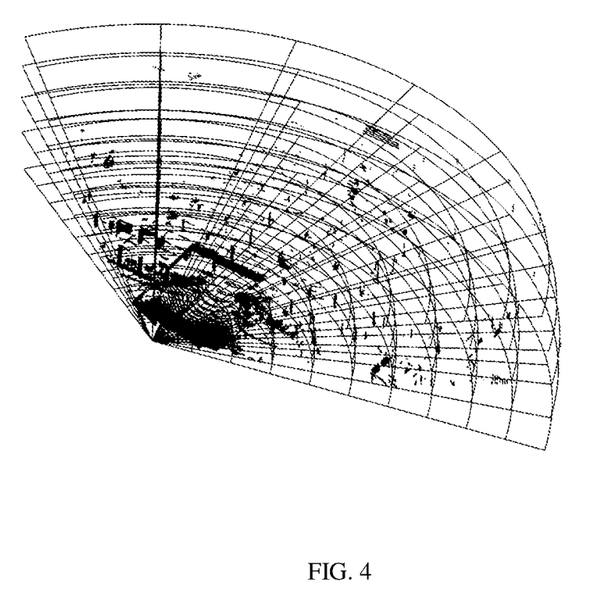
FIG. 4 illustrates an overall schematic diagram after space division.
Figure 5:
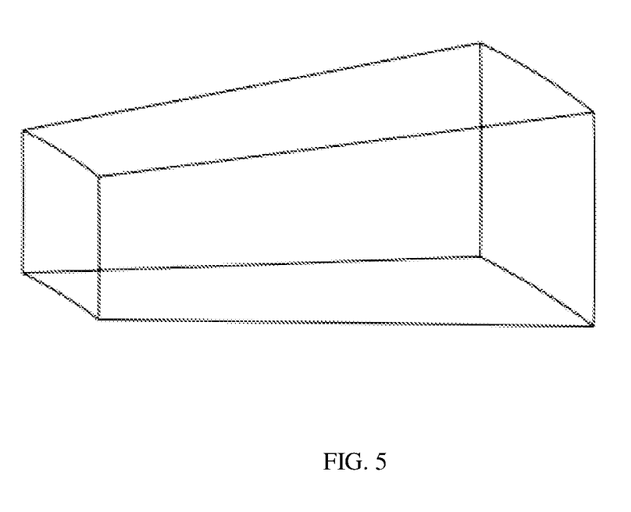
FIG. 5 shows a schematic diagram of a single space unit after space division.
Figure 6:
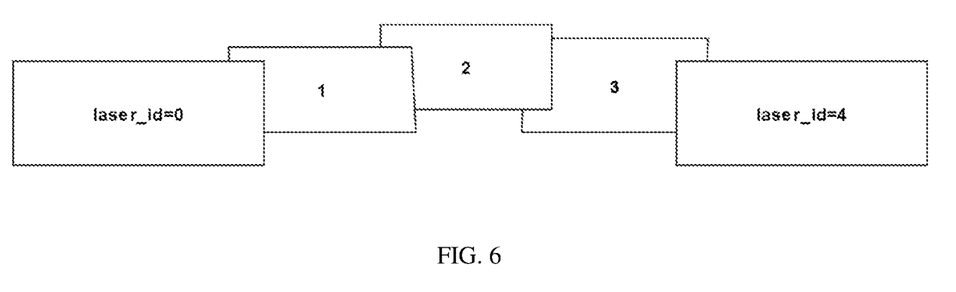
FIG. 6 is a schematic diagram of channel arrangement of solid-state lidar.
Figure 7:
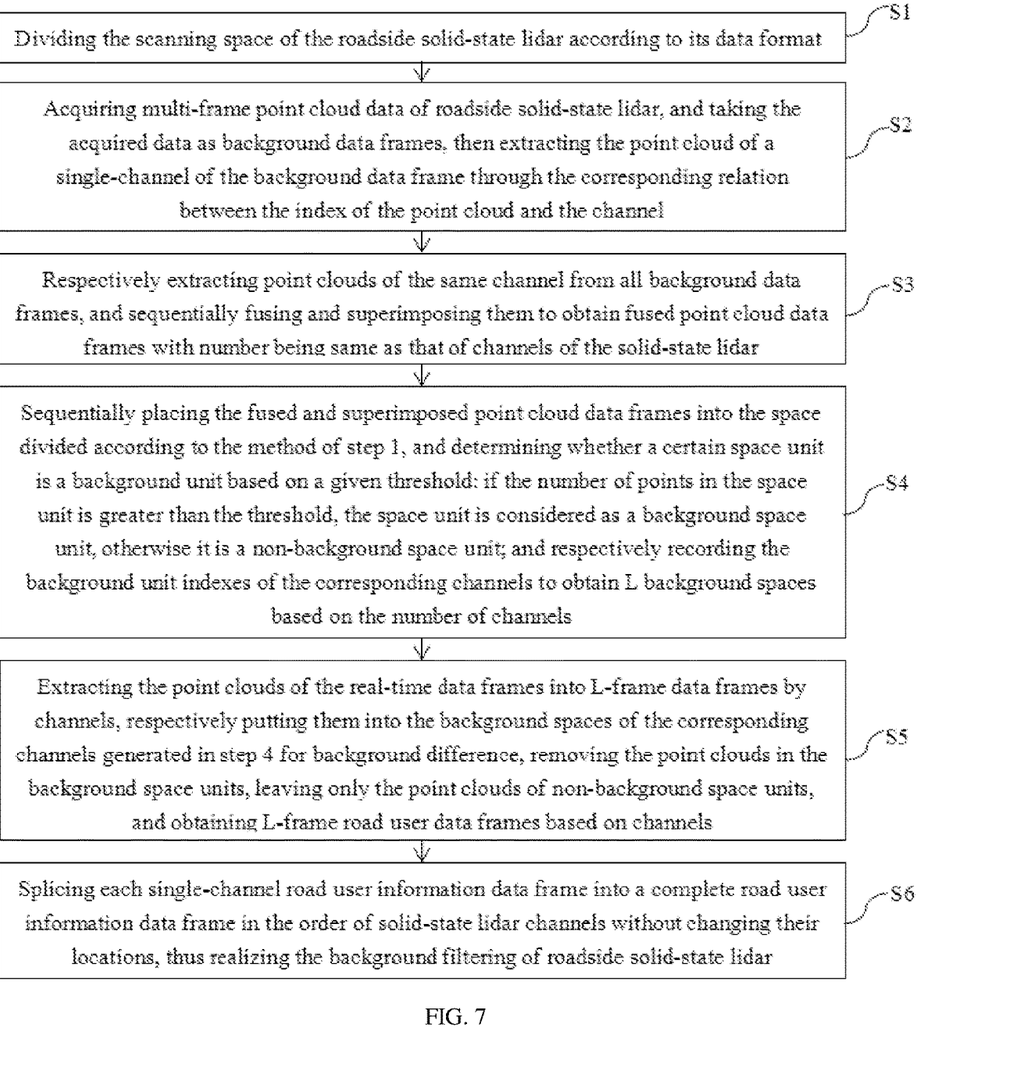
FIG. 7 illustrates a process of the method of this application.

Specifically, as shown in FIG. 7, the application includes:

S1, dividing the scanning space of the roadside solid-state lidar according to its channel scanning angle;

where the lidar obtains parameters including but not limited to distance, altitude, and azimuth by comparing emission signal with echo signal of laser; FIG. 6 shows an internal channel arrangement of the solid-state lidar, where each channel has a certain misalignment in the arrangement, resulting in a different vertical angle that each channel can scan to, and adjacent channels will have repeated scans at a certain horizontal angle; in order to divide the scanning space as accurately and easily as possible, the space is divided according to maximum and minimum vertical angles, maximum and minimum horizontal angles, and distances that can be scanned by solid-state lidar; as shown in FIG. 2, the vertical angle of solid-state lidar ranges from −12.5 degrees (°) to +12.5°, and the angular resolution is about 0.2° (equivalent to about 125 lines); from FIG. 3, it can be seen that the horizontal angular resolution of the same laser beam is about 0.2°, so the scanning space is divided according to maximum and minimum vertical angles, maximum and minimum horizontal angles, and distances of the solid-state lidar, as shown in FIG. 4; and the road space is divided into single divided space units, as shown in FIG. 5; and the spherical coordinate of the solid-state lidar point cloud is $(\alpha, \varphi, \rho)$, the road space is divided according to $\varphi$, $\alpha$, and $\rho$; the vertical angle resolution $\gamma$, horizontal angle resolution $\theta$ and distance resolution $\mu$ are set according to the computing resources and required precision, and the road space is divided into N space units;

S2, acquiring multi-frame point cloud data of roadside solid-state lidar, and taking the acquired data as background data frames, then extracting the point cloud of a single-channel of the background data frame through the corresponding relation between the index of the point cloud and the channel, including:

as can be seen from FIG. 6, there may be some areas with high density of point cloud due to the existence of repeatedly scanned areas, which will be seen as background units in the background filtering as the result of improper selection of the threshold value, thus directly affecting the performance of background filtering;

as show in the FIG. 6, the whole solid-state lidar is horizontally arranged with L laser channels, with certain staggering of positions in the vertical direction, where the corresponding relation between the Point ID of the point cloud and the laser channel is:

$$n_{ID} \div L = m \ldots i \qquad (1);$$

among them, $n_{ID}$ is the Point ID of a nth point, L is a number of laser channels of the solid-state lidars, and i is in a range of $0 \leq i \leq L-1$; when $i=0$, that is, a remainder is 0, the point cloud at this time belongs to channel laser 0 . . . and when $i=L-1$, the point cloud at this time belongs to the channel laser (L−1); then traversing the Point ID of all point clouds in a frame of data, and determining which channel a single point cloud belongs to based on the remainder obtained after dividing by the number of channels;

S3, respectively extracting point clouds of the same channel from all background data frames, and sequentially fusing and superimposing them to obtain fused point cloud data frames with number being same as that of channels of the solid-state lidar;

since a single background data frame is not enough to represent the whole background scene, and some noise is inevitable, multi-frame backgrounds are therefore fused to construct data frame fusion so as to reduce the influence of noise; meanwhile, as most of the background points in the road are fixed and only a small part is dynamic road users, the fixed background points will be increased in a certain space unit by background constructing data frame fusion, and the space unit occupied by road users will not be increased; n frames of original data are selected as background constructing frames, and then channel point clouds are extracted, where L channel point clouds can be extracted from each frame respectively, and n frames of original data frames are fused and superimposed into L frames of fused point clouds, with each frame point cloud being an collection of single-channel point clouds of all background constructing frames;

S4, sequentially placing the fused and superimposed point cloud data frames into the space divided according to the method of S1, and determining whether a certain space unit is a background unit based on a given threshold: if the number of points in the space unit is greater than the threshold, the space unit is considered as a background space unit, otherwise it is a non-background space unit; and respectively recording the background unit indexes of the corresponding channels to obtain L background spaces based on the number of channels:

since the number of background space unit point clouds is definitely greater than that of non-background space unit point clouds, a threshold is set; and if the number of point clouds in a space unit is greater than this threshold, the space unit is considered as a background unit;

and the point clouds of different channels will not influence each other, so finding out the background space units of the corresponding channels respectively can eliminate the influence of the repeated scanning area of the solid-state lidar on the filtering effect;

S5, extracting the point clouds of the real-time data frames into L-frame data frames by channels, respectively putting them into the background spaces of the corresponding channels generated in S4 for background difference, removing the point clouds in the background space units, leaving only the point clouds of non-background space units, and obtaining L-frame road user data frames based on channels; and S6, splicing each single-channel road user information data frame into a complete road user information data frame in the order of solid-state lidar channels without changing their locations, thus realizing the background filtering of roadside solid-state lidar.

As comparing to algorithm of the prior art, the present application firstly the spatial dividing method based on the point cloud data format of solid-state lidar, then, the data obtained by the roadside solid-state lidar is used as the background constructing frame, and by extracting the single-channel point cloud, each channel point cloud of the background data frame is respectively fused to obtain the fused data frame with the same number of channels as the solid-state lidar; then, based on the given threshold, each background space unit and non-background space unit based on the channel scanning space are identified; the channel point clouds of real-time data frames are respectively extracted and placed into the corresponding channel background space for background difference to obtain road user information data frames of each channel, and finally, the obtained road user information data frames of each channel are spliced into a complete road user information data frame to realize background filtering.

The background filtering based on solid-state lidar of the present application solves both the problem of declining accuracy as a result of long-time operation of road-side mechanical rotary lidar and the problem of short service life and high deployment cost of road-side mechanical rotary lidar with more line bundles; the influence of repeated scanning area of solid-state lidar on the filtering effect is eliminated, and accurate road user information is supplied to self-driving vehicles as well.

Embodiment 2

A background filtering system based on roadside solid-state lidar, including:

a multi-frame point cloud data module, a single-channel point cloud data module of background data frames, a fusion and superimposition module, a background space module, a user information data frame module, and a background filtering module;

the multi-frame point cloud data module is used for dividing a scanning space of the roadside solid-state lidar on a basis of data format of the solid-state lidar, and acquiring multi-frame point cloud data of the roadside solid-state lidar;

the single-channel point cloud data module of background data frame is used for obtaining that single-channel point cloud data of the background data frame through corresponding relation based on the multi-frame point cloud data as the background data frame;

the fusion and superimposition module is used for acquiring a fused point cloud data frame through fusion and superimposition on the basis of that single-channel point cloud data of the background data frame;

the background space module is used for dividing the fused point cloud data frame in the scanning space, and obtaining a plurality of background spaces based on channels according to a specified threshold;

the user information data frame module is used for placing the background space for background difference based on a point cloud data frame to be tested, so as to obtain a single-channel road user information data frame; and the background filtering module is used for splicing the single-channel road user information data frames into complete road user information data frames, so as to realize the background filtering of the roadside solid-state lidar.

The above embodiments only describe the preferred mode of this application, but do not limit the scope of this application. On the premise of not departing from the design spirit of this application, all kinds of modifications and improvements made by ordinary technicians in this field to the technical scheme of this application should fall within the scope of protection determined by the claims of this application.

What is claimed is:

1. A background filtering method based on a roadside solid-state lidar, comprising:
dividing a scanning space of the roadside solid-state lidar according to a channel scanning angle of the solid-state lidar to obtain multi-frame point cloud data of the roadside solid-state lidar;
taking the obtained multi-frame point cloud data as a background data frame, wherein acquiring single-channel point cloud data of the background data frame thereby using the corresponding relation between index and channel of the point cloud;

acquiring a fused point cloud data frame through a method of aggregation based on that single-channel point cloud data of the background data frame;

placing the fused point cloud data frame in the divided scanning space without changing the location of the fused point cloud, and obtaining a plurality of background spaces based on channels according to a specified threshold;

placing a point cloud data frame in the background space of the channels for background difference after extracting point cloud of each channel to obtain a single-channel road user information data frame; and splicing the single-channel road user information data frame into a complete road user information data frame to realize the background filtering of the roadside solid-state lidar;

wherein placing a point cloud data frame in the background space of the channels for background difference after extracting point cloud of each channel to obtain a single-channel road user information data frame comprises:

horizontally arranging roadside solid-state lidar by laser channels, wherein the corresponding relation between a Point ID of point cloud and the laser channels is:

$$n_{ID} \div L = m \ldots i \qquad (1);$$

wherein $n_{ID}$ is the Point ID of a $n^{th}$ point, L is a number of laser channels of the solid-state lidar, and i is in a range of $0 \le i \le L-1$; when i=0, a remainder is 0, the point cloud at this time belongs to channel laser 0 . . . and when $i=L-1$, the point cloud at this time belongs to the channel laser (L−1); and after traversing all Point ID of point cloud in a frame of data, which channel a single point cloud is determined based on the remainder obtained after dividing by the number of channels; and m is an integer value of $n_{ID}$ dividing L;

n frames of original data frames are selected as background constructing frames, and then channel point clouds are extracted, wherein point clouds in L channels are extracted from each frame respectively, and the n frames of original data frames are aggregated into L number frames of fused point clouds, with each frame of point cloud being a collection of single-channel point clouds of all background constructing frames.

2. The background filtering method based on the roadside solid-state lidar according to claim 1, wherein acquiring a fused point cloud data frame through a method of aggregation based on the single-channel point cloud data of the background data frame comprises: extracting the point clouds of a same channel in the background data frame, and sequentially aggregating the extracted point clouds to obtain fused point cloud data frame with number of frames being same as the number of the channels of the solid-state lidar.

3. The background filtering method based on the roadside solid-state lidar according to claim 1, wherein acquiring a fused point cloud data frame through a method of aggregation based on that single-channel point cloud data of the background data frame comprises: placing the fused point cloud data frame in the divided scanning space without changing the location of fused point cloud, determining whether a corresponding space unit is a background unit based on the specified threshold, and recording an index of the background unit to obtain that plurality of background spaces based on channels.

4. The background filtering method based on the roadside solid-state lidar according to claim 1, wherein the complete road user information data frame is obtained by splicing the single-channel road user information data frames without changing their positions.

5. A background filtering system based on a roadside solid-state lidar, comprising: a multi-frame point cloud data module, a single-channel point cloud data module of background data frames, an aggregation module, a background space module, a user information data frame module, and a background filtering module;

wherein the multi-frame point cloud data module is used for dividing a scanning space of the roadside solid-state lidar on a basis of data format of the solid-state lidar, and acquiring multi-frame point cloud data of the roadside solid-state lidar;

the single-channel point cloud data module of background data frame is used for obtaining that single-channel point cloud data of the background data frame using corresponding relation based on the multi-frame point cloud data as the background data frame;

the aggregation module are used for acquiring a fused point cloud data frame through aggregation on the basis of that single-channel point cloud data of the background data frame;

the background space module is used on a basis of placing the fused point cloud data frame in the divided scanning space, and obtaining a plurality of background spaces based on channels according to a specified threshold;

the user information data frame module is used on a basis of placing the background space for background difference according to channels based on a point cloud data frame to be tested, so as to obtain a single-channel road user information data frame, comprising: horizontally arranging roadside solid-state lidar by laser channels, wherein the corresponding relation between a Point ID of point cloud and the laser channels is:

$$n_{ID} \div L = m \ldots i \qquad (1);$$

wherein $n_{ID}$ is the Point ID of a nth point, L is a number of laser channels of the solid-state lidars, and i is in a range of $0 \le i \le L-1$; when i=0, a remainder is 0, the point cloud at this time belongs to channel laser 0 . . . and when $i=L-1$, the point cloud at this time belongs to the channel laser (L−1); and after traversing all Point ID of point cloud in a frame of data, which channel a single point cloud belongs to is determined based on the remainder obtained after dividing by the number of channels; and m is an integer value of $n_{ID}$ dividing L;

n frames of original data frames are selected as background constructing frames, and then channel point clouds are extracted, wherein point clouds in L channels are extracted from each frame respectively, and the n frames of original data frames are aggregated into L number frames of fused point clouds, with each frame of point cloud being a collection of single-channel point clouds of all background constructing frames.

* * * * *